US009258761B2

(12) United States Patent
Bertrand et al.

(10) Patent No.: US 9,258,761 B2
(45) Date of Patent: Feb. 9, 2016

(54) OBTAINING, BY A TERMINAL, OF INFORMATION RELATING TO ACCESS TO A SERVICE

(75) Inventors: Gilles Bertrand, Issy-Les-Moulineaux (FR); Frédéric Fieau, Paris (FR); Gaël Fromentoux, Pleumeur Bodou (FR); Olivier Legrand, Plouaret, FL (US)

(73) Assignee: Orange, Paris (FR)

( * ) Notice: Subject to any disclaimer, the term of this patent is extended or adjusted under 35 U.S.C. 154(b) by 13 days.

(21) Appl. No.: 14/130,234

(22) PCT Filed: Jun. 26, 2012

(86) PCT No.: PCT/FR2012/051469
§ 371 (c)(1),
(2), (4) Date: Mar. 24, 2014

(87) PCT Pub. No.: WO2013/001230
PCT Pub. Date: Jan. 3, 2013

(65) Prior Publication Data
US 2014/0206349 A1   Jul. 24, 2014

(30) Foreign Application Priority Data

Jun. 30, 2011   (FR) ..................................... 11 55878

(51) Int. Cl.
*H04W 4/00* (2009.01)
*H04W 40/24* (2009.01)
(Continued)

(52) U.S. Cl.
CPC ............ *H04W 40/246* (2013.01); *H04W 4/003* (2013.01); *H04W 48/18* (2013.01); *H04L 61/1541* (2013.01); *H04L 67/16* (2013.01); *H04W 4/02* (2013.01); *H04W 48/14* (2013.01)

(58) Field of Classification Search
CPC .................... G06F 17/3053; G06F 2203/0381; G06F 17/30554; G06F 17/30696; G06F 17/5072; G10L 25/54; H04W 48/16; H04W 4/008; H04W 36/24; H04W 84/12; H04W 48/18; H04W 4/02; H04W 64/00; H04W 16/14

USPC ......................................................... 455/434
See application file for complete search history.

(56) References Cited

U.S. PATENT DOCUMENTS

2003/0069018 A1 *   4/2003   Matta et al. ................... 455/436
2005/0010653 A1     1/2005   McCanne
(Continued)

FOREIGN PATENT DOCUMENTS

WO        2008049132 A2    4/2008

OTHER PUBLICATIONS

International Search Report dated Sep. 19, 2012 for corresponding International Application No. PCT/FR2012/051469, filed Jun. 26, 2012.

(Continued)

*Primary Examiner* — Kwasi Karikari
(74) *Attorney, Agent, or Firm* — David D. Brush; Westman Champlin & Koehler, P.A.

(57) ABSTRACT

A method is provided with which a terminal can obtain information relating to a radio environment. The method includes the following steps: a discovery device receives a request from the terminal to discover a radio environment; the discovery device determines a list comprising a plurality of access points that belong respectively to an access network and are provided to supply radio coverage at a current location of the terminal; a piece of information is obtained relating to an access to a service by using the access points on the list; the list is enriched with the information obtained in association with the access point; the enriched list is scheduled according to at least one criterion relating to the service; and the ordered list is sent to the terminal by the discovery device.

11 Claims, 4 Drawing Sheets

(51) Int. Cl.
*H04W 48/18* (2009.01)
*H04L 29/12* (2006.01)
*H04W 4/02* (2009.01)
*H04W 48/14* (2009.01)
*H04L 29/08* (2006.01)

(56) References Cited

U.S. PATENT DOCUMENTS

| | | |
|---|---|---|
| 2005/0286478 A1 | 12/2005 | Mela et al. |
| 2007/0141986 A1 | 6/2007 | Kuehnel et al. |
| 2009/0234950 A1 | 9/2009 | Wikman et al. |
| 2009/0274069 A1* | 11/2009 | Olsson et al. ............... 370/255 |
| 2009/0278705 A1* | 11/2009 | Chhabra et al. .......... 340/825.49 |

OTHER PUBLICATIONS

Huawei, "Discussion about ANDSF" 3GPP Draft: S2-083355, 3rd Generation Partnership Project (3GPP), Mobile Competence Centre; 650, Route Des Lucioles; F-06921 Sophia-Antipolis Cedex; France, vol. SA WG2, no. Prague; May 2, 2008, XP050265579.

Das et al., "DHCPv4 and DHCPv6 Options for Access Network Discovery and Selection Function (ANDSF) Discovery; rfc6153. txt", DHCPV4 and DHCPV6 Options for Access Network Discovery and Selection Function (ANDSF) Discovery; RFC6153.txt, Internet Engineering Task Force, IETF; Standard, Internet Society (ISOC) 4, Rue Des Falaises Ch-1205 Geneva, Switzerland, Mar. 1, 2011, pp. 1-7, XP015075896.

International Search Report and English Translation of the Written opinion dated Sep. 26, 2012 for corresponding International Application No. PCT/FR2012/051469, filed Jun. 26, 2012.

* cited by examiner

OBTAINING, BY A TERMINAL, OF INFORMATION RELATING TO ACCESS TO A SERVICE

CROSS-REFERENCE TO RELATED APPLICATIONS

This Application is a Section 371 National Stage Application of International Application No. PCT/FR2012/051469, filed Jun. 26, 2012, which is incorporated by reference in its entirety and published as WO 2013/001230 on Jan. 3, 2013, not in English.

FIELD OF THE DISCLOSURE

The invention relates to a technique of obtaining by a terminal of information relating to a radio environment. More precisely, an item of information relating to access to a service is obtained.

The invention lies in the field of telecommunications and more particularly that of access to a service.

BACKGROUND OF THE DISCLOSURE

Considered hereinafter is the particular case of a contents distribution service, intended to distribute contents on demand CoD, for "Content on Demand". Access to this service is performed by way of an access network. It is considered that a terminal is able to access two different access networks, for example two wireless networks. A contents distribution network is associated with each of the access networks. When the terminal transmits by way of one of the two access networks a request for access to a content, said request is processed by the contents distribution network associated with the access network that routed the request. This association between an access network and a contents distribution network is as a general rule fixed. However, the contents distribution network processing the request may not be in a position to process the request.

Document US2005/0010653 discloses a redirection method in which the request for access to a content is routed at the application package level toward contents distribution service attachment nodes as a function of measurements of server loadings, of characteristics of paths in the network, of network policies, etc.

However, this method is complex to implement in an existing pool of terminals and in the absence of standardization thereof. This solution is usable specifically in contents distribution networks implementing this redirection method. Its use in any other contents distribution network does not make it possible to access the sought-after content.

SUMMARY

According to a first aspect, the subject of the invention is a method of obtaining by a terminal of information relating to a radio environment, this method comprising the following steps:
a step of reception by a discovery device of a discovery request in respect of a radio environment originating from the terminal;
a step of determination by the discovery device of a list comprising a plurality of access points, belonging respectively to an access network and designed to provide radio coverage of a current location of the terminal;
a step of dispatching by the discovery device of the list to the terminal. The obtaining method furthermore comprises:
a step of obtaining an item of information relating to access to a service by way of the access points of the list;
a step of enriching the list with the item of information obtained in association with the access point;
a step of ordering the enriched list as a function of at least one criterion relating to the service, the ordered list being dispatched by the discovery device to the terminal.

The invention thus finds an advantageous application in the case of a terminal allowing accesses to various wireless networks.

The upgrades of the UMTS ("Universal Mobile Terrestrial Service") standard make provision in particular for a radio environment discovery function ANDSF, for "Access Network Discovery and Selection Function", allowing a terminal to obtain information relating to its radio environment in the form of a list, in particular of available access points, 3GPP or non-3GPP. This list allows in particular the terminal to select thereafter an access point to which it will connect. The non-3GPP access points are access points not complying with the UMTS standard, for example WIFI®, WIMAX® etc. access points. This ANDSF function of the network is able to provide a list of access points available as a function of a location of the terminal. It is moreover specified in the 3GPP TS 24.302 standard, entitled "Access to the Evolved Packet Core (EPC) via non-3GPP Access Networks; Stage 3", and the 3GPP TS 24.312 standard, entitled "Access Network Discovery and Selection Function (ANDSF) Management Object (MO)".

The access points of the list are situated in a neighborhood of the terminal. More precisely, these entail access points whose radio coverage includes the location of the terminal. An access point is connected to an access network, that is to say it proposes a connectivity to terminals which access the network by way of it. The access point is in the operating state and has resources available. The service access related item of information transmitted to the terminal by virtue of the obtaining method makes it possible to indicate to the latter whether it is possible to access the service sought by way of the access point.

The origin of the invention derives from a problem identified in association with a contents distribution service. However, the solution proposed is applicable to any type of service and thus allows the terminal to select an access point of an access network making it possible to access the service sought.

The obtaining method thus makes it possible to redirect the terminal toward an access point adapted for this access to the service. For the contents distribution service, the redirection can be implemented without modifying the coding of the contents identifiers.

Moreover, the terminal thus obtains information adapted to its current location. Moreover, a saving is achieved in the terminal's processor and hardware resources, since the terminal does not need to access an access network by way of which it is not possible to access the service sought.

The item of information relating to access to the service can be obtained directly by the discovery device from the service provider or else indirectly by way of a mediation entity, charged with obtaining this item of information.

The list is ordered and makes it possible to thus provide implicitly an order between the various access points. The entities of the network, and thus the operator of the network, can influence the selection made by the terminal.

According to a particular characteristic, the obtaining method furthermore comprises a step of determining a list of access networks making it possible to access the service, said determining step being implemented prior to the reception step.

An item of information on the basis of which the discovery device can construct a first list of access points before enrichment is thus available to it at the access network level.

According to a particular characteristic, the request transmitted by the terminal comprises an item of information relating to the service.

This makes it possible to limit the transmission of the information relating to access to the service sought.

Advantageously, the service being a contents distribution service, the criterion belongs to the group comprising a profile of a user of the terminal in respect of the service, a degree of loading of a contents distribution network accessible by way of an access network, an occurrence of a problem on the contents distribution network.

In this embodiment, the discovery server can thus take into account various criteria, such as constraints at the operator level. The association between an access network and a contents distribution network is as a general rule fixed. One and the same contents distribution network may however be associated with various access networks. When the access network is selected, so also is the associated contents distribution network. The obtaining method thus makes it possible to introduce some flexibility for accessing the contents distribution networks. The terminal is thus steered toward an access point which makes it possible to access the best adapted contents distribution network.

According to yet another particular characteristic, the service being a contents distribution service, a plurality of contents distribution networks being accessible by way of the access point, the obtaining method furthermore comprises:
a step of receiving from the terminal an identifier of a content;
a step of selecting a distribution network of said plurality as a
    function of the content identifier and of redirecting the
    terminal toward the selected distribution network.

The selection is thus performed as a function of the sought-after content and makes it possible to increase the service quality perceived by the user of the terminal.

According to yet another particular characteristic, the obtaining method comprises prior to the selection step, a verification via an authenticating entity of the access network that the terminal is authenticated.

This makes it possible to guarantee that the terminal is properly authorized to access the service.

According to yet another particular characteristic, the service being a contents distribution service, the obtaining method furthermore comprises:
a step of receiving a contextual item of information relating to
    a contents distribution network;
a step of updating the ordered list as a function of the contextual item of information;
a step of dispatching the updated ordered list to the terminal.

The contextual item of information can be for example an item of information relating to a problem affecting the distribution of a content to another terminal, an item of information relating to the loading of a distribution network, an upgrade of a policy of the operator of the contents distribution network, the alteration of a parameter related to the terminal, etc.

The updated ordered list is transmitted spontaneously by the network to the terminal so that the latter can access the contents distribution service from another access point. The service quality perceived by the user of the terminal is improved.

According to a second aspect, the invention relates to a device for discovery of a radio environment, arranged to transmit to a terminal information relating to a radio environment. The device comprises the following means:

means for receiving a discovery request in respect of a radio
    environment originating from the terminal;
means for determining a list comprising a plurality of access
    points, belonging respectively to an access network and
    designed to provide radio coverage of a current location of
    the terminal;
means for obtaining an item of information relating to access
    to a service by way of said access point of the list;
means for enriching the list with the item of information
    obtained in association with the access point;
means for dispatching the enriched list to the terminal.

In a particular embodiment, the discovery device furthermore comprises means for ordering the enriched list as a function of at least one criterion relating to the service, the ordered list being dispatched terminal.

According to a third aspect, the invention relates to a system for obtaining information relating to a radio environment comprising a discovery device such as described above and a mediation entity, this entity comprising:
means for obtaining information relating to a service on the
    basis of entities implementing the service;
communication means, arranged to provide the discovery
    device with the item of information relating to access to the
    service by way of an access point.

According to a fourth aspect, the invention also relates to a computer program comprising instructions for the implementation of the obtaining method according to the first aspect, implemented by a discovery device, when this program is executed by a processor.

BRIEF DESCRIPTION OF THE DRAWINGS

The invention will be better understood with the aid of the following description of particular embodiments of the method of the invention, with reference to the appended drawings in which.

DETAILED DESCRIPTION OF ILLUSTRATIVE EMBODIMENTS

Figure 1:
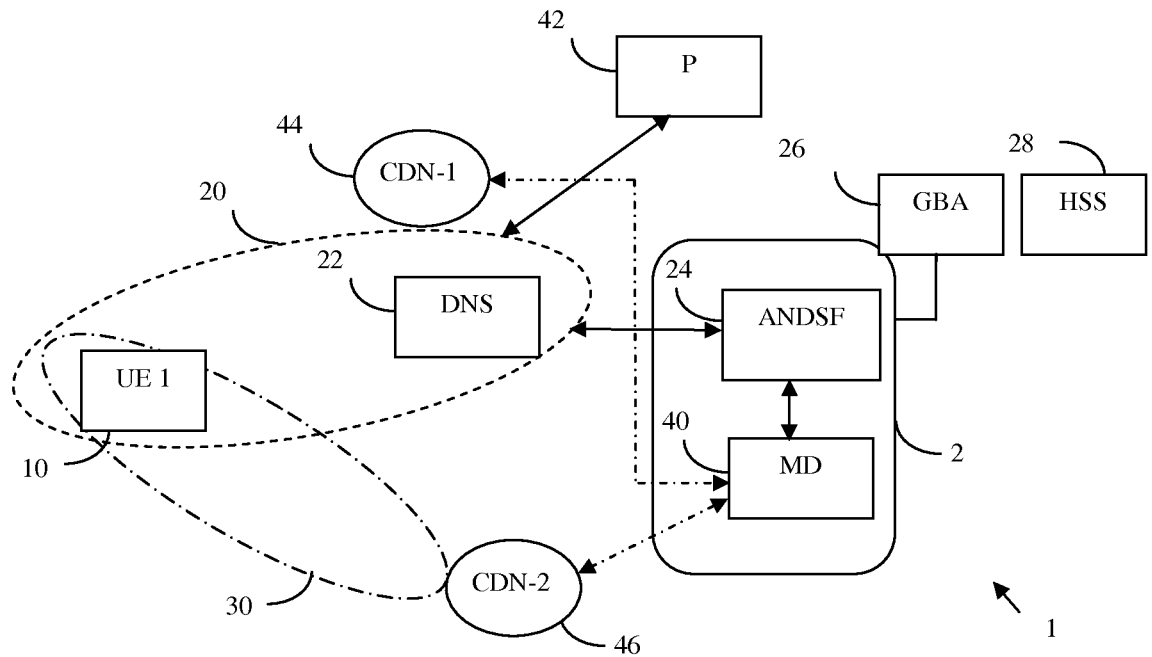
FIG. 1 represents a terminal in its environment according to a particular embodiment of the invention.

Represented schematically in FIG. 1 is a terminal 10 in its environment according to a particular embodiment. The various entities represented in FIG. 1 belong to a communication network 1.

The terminal 10 accesses a first access network 20 by way of an access point, not represented in FIG. 1. Of course the first access network 20 comprises in a conventional manner the various devices making it possible to offer wireless access to the terminal 10. The first access network is for example compliant with the UMTS specifications. A second access network 30, not compliant with the UMTS specifications, is represented in FIG. 1: it is termed "non-3GPP". It entails for example a WIFI®, WIMAX®, etc. access point. No limitation is attached to the technology of this second access network. It may thus also be compliant with the UMTS specifications.

For the sake of simplification, only two access networks are represented in FIG. 1. No limitation is attached to the number of access networks. The operator of the second access network 30 may be the operator of the first access network 20. The operators of these two access networks may also be different but authorize roaming between the two access networks.

The first access network 20 also comprises a register 28 of the subscribers of the first network or HSS, for "Home Subscriber Server" and an entity 26 GBA, for "Generic Bootstrapping Architecture" or authenticating entity, in charge of the authentication of the users in conjunction with the register of subscribers 28.

Moreover, the first access network 20 comprises a discovery server 24 for the radio environment. This discovery server 24 implements a radio environment discovery function ANDSF, for "Access Network Discovery and Selection Function", allowing a terminal to obtain information relating to its radio environment in the form of a list, in particular of access points available, 3GPP or non-3GPP, as a function of a location of the terminal. This function is specified in the 3GPP TS 24.302 and 3GPP TS 24.312 standards. The discovery server 24 stores in a table 200 a list of 3GPP and non-3GPP access points and their respective coverage zones. The access points administered by the operators of the first 20 and second networks are registered in the discovery server 24 as a function of their location. The table 200 thus stores for a given location zone, a list of access points of the first and second access networks whose radio coverage covers the location zone. Thus, as a function of the location of the terminal 10, the discovery server 24 is arranged to provide a list of access points whose radio coverage includes the location of the terminal 10 and which the terminal 10 might access. The location of the terminal may correspond to a GPS position of the terminal itself or else may be determined by means of the location of the access point by way of which it accesses the discovery server 24. The discovery server 24 is designed to respond to radio environment discovery requests issued by the subscriber terminals of the first access network 20. It is also able to initiate a transmission of information relating to the access networks to a terminal, this transmission being triggered on the initiative of the network or else subsequent to an earlier communication with the terminal. According to the invention, the table 200 furthermore comprises for each of the access points associated with a location zone, one or more items of information respectively relating to access to one or more services. An item of information relating to access to a given service thus makes it possible to indicate to the terminal whether access to the service is possible from this access point.

The first access network 20 furthermore comprises a domain names server 22, able to establish a correspondence between an address in the communication network 1 and a domain name.

With the first access network 20 is associated a first contents distribution network 44 or CDN-1, able to provide contents to terminals accessing by way of the first access network 20. With the second access network 30 is associated a second contents distribution network 46 or CDN-2, able to provide contents to terminals accessing by way of the second access network 30. No limitation is attached to the type of the contents provided by the first 44 and second 46 contents distribution networks. Moreover, in the example of FIG. 1, a single contents distribution network is associated with an access network. Of course a plurality of contents distribution networks may be associated with an access network. It is also possible to have several access networks associated with a single contents distribution network.

Still in FIG. 1 is represented a portal 42 for access to the contents distribution service. This portal 42 is able to receive a content access request dispatched by a terminal and to redirect the requesting terminal to a server of a contents distribution network with a view to the provision of the content. According to the invention, the terminal is redirected to a mediation entity 40. This mediation entity 40 is linked to the discovery server 24 as well as to the first 42 and second 44 contents distribution networks. The mediation entity 40 comprises a table 308, storing an association between an access network and one or more contents distribution networks. The mediation entity 40 is in particular able to obtain information relating to access to a service on the basis of the contents distribution networks, to collect information relating to the distribution of the contents toward client entities and to cooperate with the discovery server 24 for the implementation of the obtaining method.

The discovery server 24 and the mediation entity 40 form a system 2 for obtaining information relating to a radio environment.

It is specified here that the first access network 20 corresponds to the nominal network of the terminal, that is to say the network where a user of the terminal is subscribed. Subsequently, the term terminal corresponds equally well the equipment itself and to the user of the terminal. In what is described subsequently, the terminal 10 accesses the discovery server 24 of its nominal network by way of access points belonging to this same network. No limitation is attached to such access. The terminal can indeed communicate with the discovery server 24 of its nominal network by accessing by way of the second access network, or yet another access network, not represented in FIG. 1.

The method of obtaining by the terminal of information relating to a radio environment will now be described in conjunction with FIGS. 2, 3 and 4. Only the steps necessary for the understanding of the invention are represented.

Figure 2:
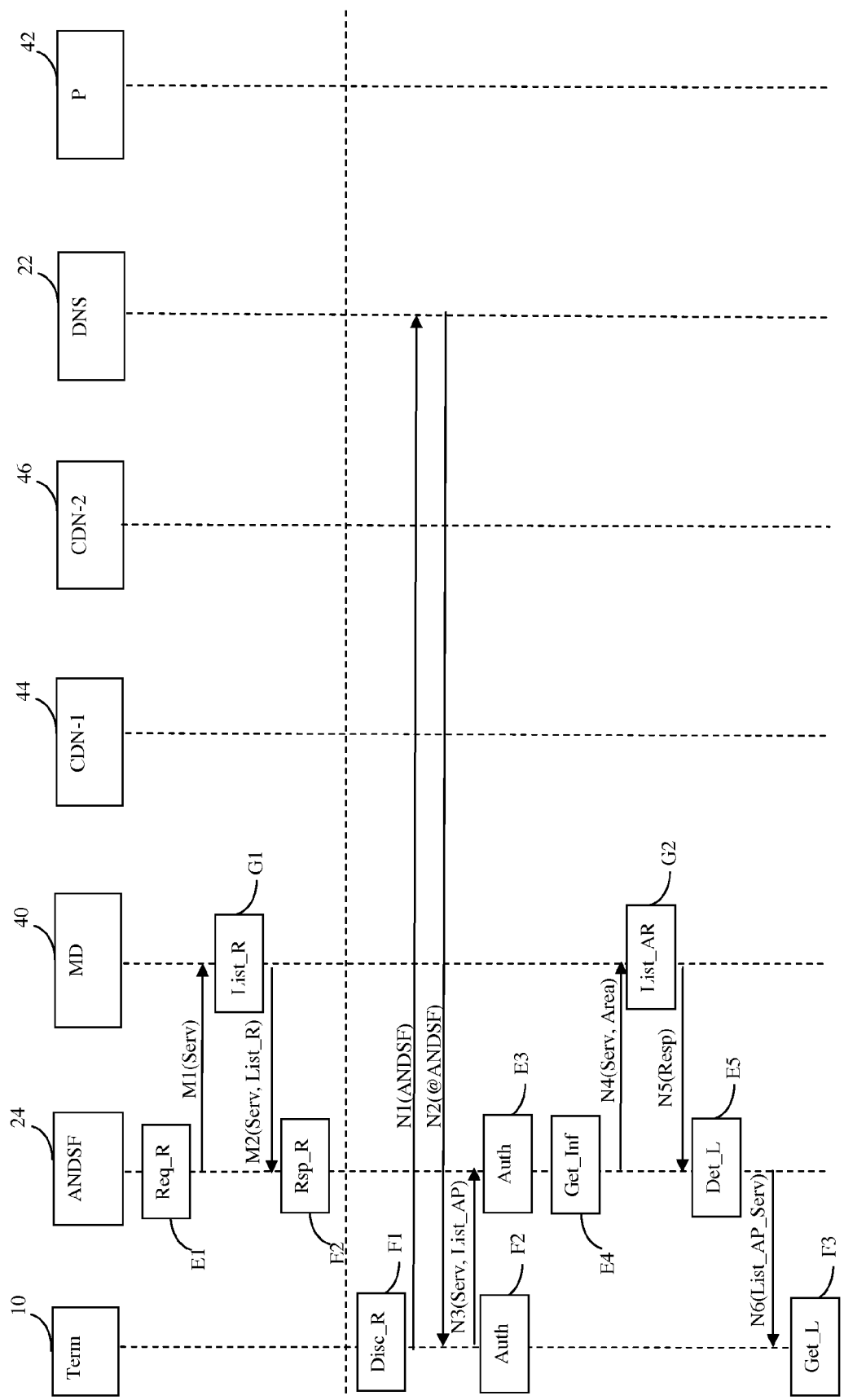
FIG. 2 represents a schematic of the exchanges between the various entities implementing the obtaining method according to first and second phases of a particular embodiment of the invention.
Figure 3:
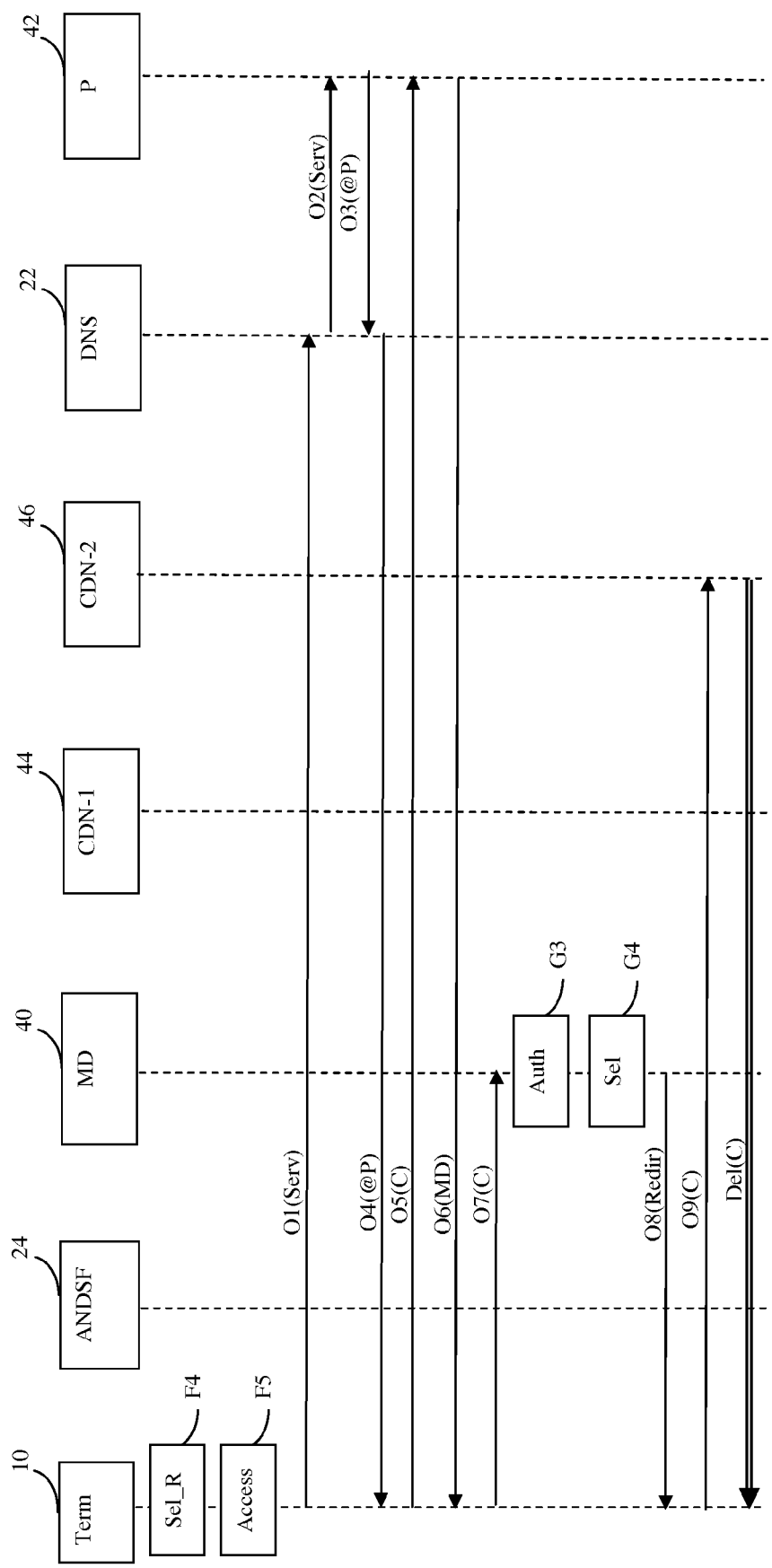
FIG. 3 represents a schematic of the exchanges between the various entities implementing the obtaining method according to a third phase of a particular embodiment of the invention.

We shall initially describe in conjunction with FIG. 2 a first phase of the obtaining method in which the discovery server 24 enriches the table 200 with the aid of information relating to access to a service. Considered hereinafter is the particular case where the service corresponds to the contents distribution server. However, the obtaining method described subsequently is readily transposable to other types of service.

It is recalled here that the table 200 stores for a location zone a list of 3GPP or non-3GPP access points.

In a first step E1, the discovery server 24 transmits a request M1 to the mediation entity 40 so as to obtain the information relating to access to the contents distribution service. The request M1 comprises in particular an item of information making it possible to identify the contents distribution service, for example a service identifier.

In a step G1, the mediation entity 40 receives the request M1, determines a list of access networks making it possible to access the service requested on the basis of the information stored in the table 308 and transmits to the discovery server 24 a response M2 comprising the access networks list determined.

In a step E2, the discovery server 24 receives the response M2 and stores in the table 200 for each access point the item of information relating to access to the service with the aid of the access networks list received.

More precisely, the table 200 stores on completion of this step E2, for a given location zone, a list of access points and for each access point an item of information relating to access to the service from this access point. It is recalled here that the access points might belong to different access networks. A first level of information as regards access to the service is thus available to the discovery server 24.

This step E2 terminates the first phase of the obtaining method.

In the initial state, the terminal 10 is registered with the first access network 20.

A second phase of the obtaining method, also represented in FIG. 2, corresponds more precisely to the steps allowing the terminal 10 to obtain a list of access points corresponding to its current location.

In a step F1, the terminal 10 transmits a request N1 destined for the domain names server 22, so as to obtain an address in the communication network 1 of the discovery server 24. The terminal 10 receives in return a response N2 comprising this address. For example the message N1 is a "DNS Request" message and the message N2 is a "DNS Response" message.

Still in this step F1, the terminal 10 transmits a radio environment discovery request N3 destined for the discovery server 24. This request N3 indicates that the terminal 10 desires to receive an access points list which is adapted to its current location. In a particular embodiment, the request N3 relates to a given service. In the example detailed here this entails the contents distribution service.

In a step E3, the discovery server 24 receives the discovery request N3 and cooperates with the register of subscribers 28 and the entity 26 GBA to authenticate the user of the terminal 10. Step F2 corresponds to the implementation of the authentication at the level of the terminal 10. On completion of these steps E3 and F2, a secure tie is established between the terminal 10 and the discovery server 24.

Once the secure tie has been established, in an obtaining step E4, the discovery server 24 determines on the basis of the table 200 a list of access points designed to provide radio coverage of the current location of the terminal 10, these access points being able a priori to provide access to the service sought. Next the discovery server 24 transmits a message N4 to the mediation entity 40. This step E4 is aimed at obtaining for at least one of the access points of the list an item of information relating to access to the service by way of this access point. This message N4 indicates in particular a network zone where the terminal 10 is situated. For a given network zone, the various access networks can be organized in a hierarchical manner.

In a step G2, the mediation entity 40 determines the item of information relating to access to the service sought for this access point concerned and transmits a response message N5. The latter comprises the determined item of information.

The response message N5 is received by the discovery server 24 in a step E5. It is stressed here that the discovery server 24 can obtain the information associated with all or part of the list of access points in a single or else several interrogations of the mediation entity 40. For each access point, the item of information relating to access to the service is thus updated as a function of the period wherein the terminal will actually access the service.

In this step E5, the discovery server 24 enriches the list of access points with the aid of the information relating to access to the service received in the message N5 and transmits to the terminal 10 a response message N6, comprising this enriched list.

The response message N6 is received by the terminal 10 in a step F3.

This terminates the second phase of obtaining by the terminal of an access points list enriched with the aid of the information relating to access to the service sought.

The third phase of delivery of the content will now be described in conjunction with FIG. 3.

It is recalled here that the terminal 10 has obtained in step F3 in the response message N6 an access points list enriched with the aid of the information relating to access to the service.

In a step F4, the terminal 10 selects from this enriched list a particular access point, by way of which it is possible to access the contents distribution service. This may entail an access point belonging to the first access network 20, or else an access point belonging to the second access network 30. In the latter case, the terminal 10 must register beforehand with the second network 30 before implementing the following steps. By way of nonlimiting example, the terminal 10 can select the access point situated in first position in the list and allowing access to the service sought. Considered subsequently is the case where the terminal 10 selects an access point of the second access network 30.

In a step F5, the terminal 10 transmits a message O1 destined for the domain names server 22, so as to obtain an address in the communication network of the portal 42 for access to the contents distribution service. The domain names server 22 transmits a message O2 destined for the portal 42 and obtains in return a message O3, comprising the address sought. This address is retransmitted destined for the terminal 10 in a message O4. The messages O1 and O2 are for example "DNS Request" messages and the messages O3 and O4 are "DNS Response" messages.

The terminal 10 thereafter transmits a message O5 requesting access to a content destined for the portal 42 for access to the contents distribution service, the portal being identified by its address in the communication network 1. The message O5 requesting access to a content comprises in particular an identifier of the sought-after content. By way of illustration, the message O5 is for example an "Http Request" message. The identifier of the content is for example a universal address of the content (URL). This universal address makes it possible to access the sought-after content whatever the contents distribution network.

According to the invention, the portal 42 redirects by a message O6 the terminal 10 to the mediation entity 40. It is stressed here that during the redirection, the content identifier is not necessarily the same as that transmitted by the terminal in the message O5.

The terminal 10 then transmits a message O7 requesting access to a content to the mediation entity 40. The message O7 requesting access to a content comprises in particular the identifier of the sought-after content.

In a step G3, the mediation entity 40 receives the message O7. The mediation entity 40 can verify via the function GBA that the terminal 10 is properly authenticated. This verification is optional. It makes it possible to verify that the user of the terminal 10 is indeed who he purports to be.

In a step G4, the mediation entity 40 selects one of the contents distribution networks as a function of the access network by way of which the terminal 10 accesses and also as a function of the sought-after content. In the particular case illustrated here, this entails the second distribution network 46.

Optionally, the mediation entity verifies whether the second distribution network 46 has the sought-after content. For this purpose, in a prior step, not represented in the figures, the mediation entity 40 has obtained from the first 44 and second 46 contents distribution networks available contents lists and has stored these available contents lists in association with the contents distribution network in a table, not represented. Thus, the mediation entity 40 has a table storing for a content and for each contents distribution network, an identifier of the content. In a variant, it is also possible to obtain this information on the basis of another entity of the network. In a particular embodiment, when the content is not available on the contents distribution network, the mediation entity 40 transmits this item of information to the discovery server 24, so that the latter can transmit a new list of access points to the terminal 10.

This selection step G4 is particularly advantageous when on the basis of an access network, it is possible to access a plurality of contents distribution networks.

On completion of this step G4, the mediation entity 40 transmits a message O8 for redirecting the terminal 10 to a distribution network, for example the second distribution network 46 associated with the second access network 30. This message O8 comprises an identifier of the sought-after content. In one embodiment, during step G4, the mediation entity 40 adapts the content identifier as a function of the distribution network selected and transmits this adapted content identifier in the redirection message O8. Thus, the adaptation of the identifier of the content carried out by this entity of the network makes it possible not to modify the terminal itself. Contents distribution networks, in which the identifiers of contents are coded in a different manner, can then be accessed by the terminal at will.

The terminal 10 obtains from the domain names server 22 an address in the communication network of an input server in the second contents distribution network 46. These exchanges are not represented in FIG. 4 so as not to overload it.

The terminal 10 thereafter transmits to the input server in the second network 46 a message O9 requesting the delivery of the sought-after content. In the particular embodiment, the terminal transmits in the message O9 the content identifier adapted to the contents distribution network, that it has received in the redirection message O8.

The second contents distribution network 46 thereafter delivers the sought-after content to the terminal 10.

Figure 4:
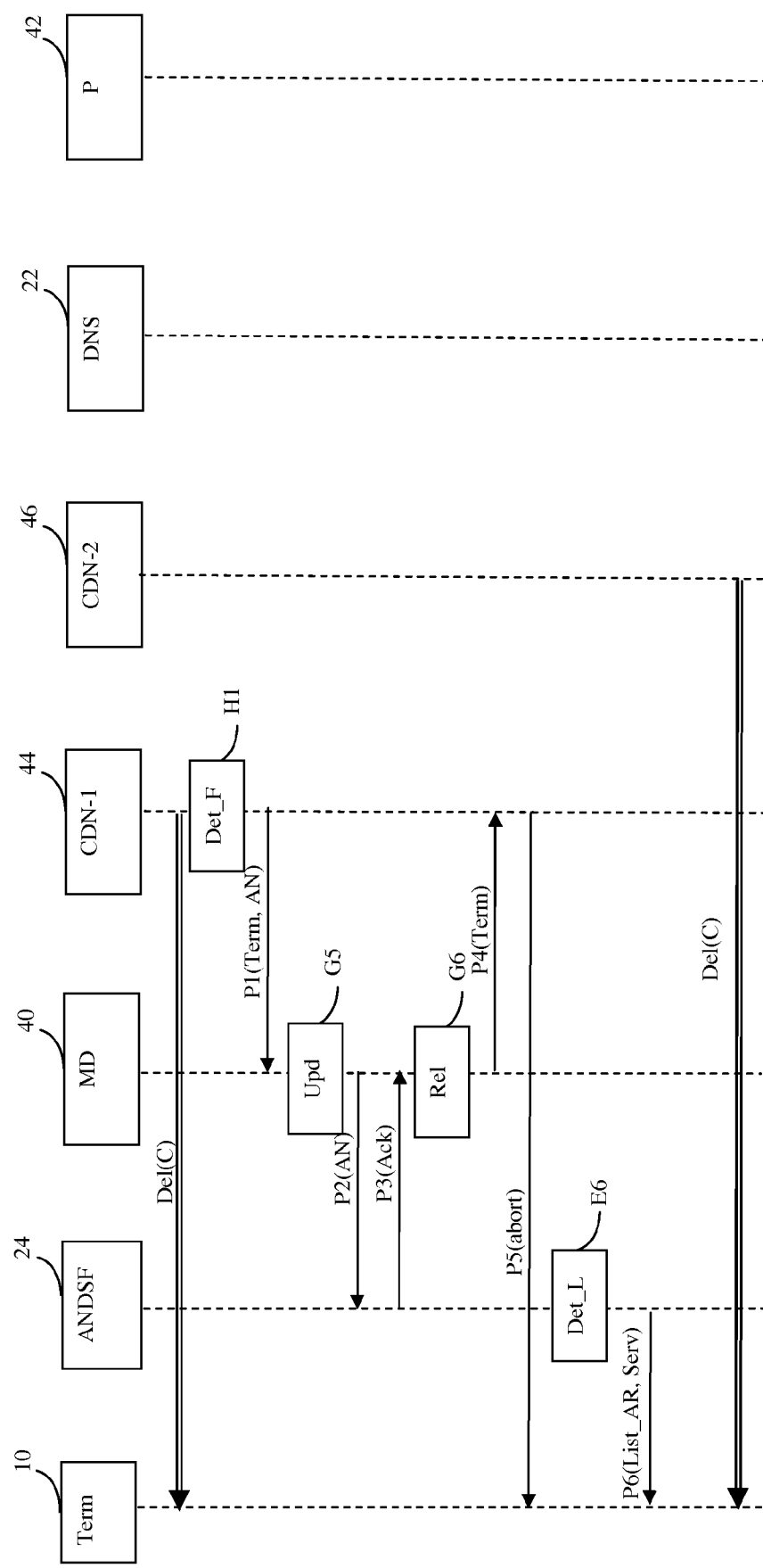
FIG. 4 represents a schematic of the exchanges between the various entities implementing the obtaining method according to a particular embodiment of the invention.

FIG. 4 represents a particular case of delivery of a content to the terminal.

In the course of the delivery of the content to the terminal 10, in a step H1, a server of the first contents distribution network 44 detects a delivery problem and informs the mediation entity 40 of this by a notification message P1. This may for example entail a packet loss problem noted in the first distribution network 44. No limitation is attached to the type of problem encountered. The problem may be temporary. The notification message P1 comprises in particular an identifier of the terminal 10, an identifier of the access network concerned in the problem or else an identifier of the contents distribution network concerned in the problem.

FIG. 4 illustrates a particular case of a problem arising during the delivery of the content to the terminal. In a particular embodiment, the server of the first contents distribution network 44 notifies the mediation entity 40 of any modification of accessibility to contents through its intermediary.

Thus the notification message P1 can comprise any type of information liable to modify the lists of points of access to the contents distribution service. This information is called contextual information and may be for example an item of information relating to a problem affecting the distribution of a content to another terminal, an item of information relating to the loading of a distribution network, an upgrade of a policy of the operator of the contents distribution network, the alteration of a parameter related to the terminal, etc. It is stressed here that this list is not exhaustive.

In a step G5, the mediation entity 40 obtains a contextual item of information relating to a contents distribution network in a notification message P1.

The mediation entity 40 identifies the discovery server 24 corresponding to the nominal network of the terminal 10 and informs the discovery server identified by a notification message P2. This notification message P2 comprises an update as a function of the contextual item of information of the list of the access networks making it possible to access the requested service. By way of nonlimiting example, when the problem is one affecting a particular contents distribution network, the mediation entity determines the access network or networks associated with this contents distribution network. The mediation entity 40 can also notify other discovery servers, if appropriate.

In a particular embodiment, the discovery server 24 modifies in the table 200 the item of information relating to access to the service for the access points of the access network concerned, so as to indicate an "access impossible" state. Thus, when other terminals subsequently contact the discovery server 24, the enriched list of access points does not indicate the access points of the first access network 20 as making it possible to access the contents distribution service. This makes it possible to steer the other terminals toward other access networks and/or other contents distribution networks.

In an optional manner, this modification can be performed for a predetermined duration, the item of information relating to access to the service by the access network concerned switching back to the "access possible" state on completion of this predetermined duration. This thus makes it possible to return to nominal operation.

The discovery server 24 acknowledges receipt of the notification message P2 by an acknowledgment message P3.

The mediation entity 40 receives in a step G6 the acknowledgment message P3 and transmits in its turn an acknowledgment message P4 to the server of the first contents distribution network. When the problem is one affecting the delivery of the content to the terminal 10, the mediation entity 40 asks, also with the aid of the message P4, the first distribution network 44 to interrupt the delivery of the content destined for the terminal 10. The following steps are implemented in this particular case.

The first contents distribution network 44 then transmits a message P5 to the terminal 10 to interrupt the delivery.

In a step E6, the discovery server 24 determines a new enriched list of access points for the terminal 10 and transmits it in "push" mode in a message P6 destined for the terminal 10. The message P6 is transmitted without prior invoking of the terminal. This allows the terminal to obtain an enriched access points list immediately. The terminal can then change access network to access the service again.

The assumption is made that the terminal 10 selects an access point of the second 30 access network. The terminal 10 again implements the steps described in conjunction with FIG. 4 and obtains the delivery of the sought-after content on the basis of the second content distribution network 46. The service quality of the contents distribution service is thus improved.

In the embodiment described above, the address in the communication network 1 has been obtained by interrogation of the domain names server 22. It is also conceivable to obtain this address from a DHCP ("Dynamic Host Configuration Protocol") server. It can also be configured in the terminal 10.

In the embodiment described above, the terminal 10 transmits in the discovery request N3 an item of information relating to the service sought. In a second embodiment, the discovery request N3 transmitted by the terminal 10 in step F1 does not specify the service sought. The discovery server 24 then transmits a list of access points indicating for each access point the service or services to which access is possible by way of the access point. The terminal 10 thereafter selects from this list an access point as a function of the service sought.

In the embodiment described above, the discovery server 24 enriches the list of access points with the aid of the information relating to access to the service. In a third embodiment, during step E5, the discovery server 24 orders the enriched list of access points as a function of at least one criterion relating to the service and transmits the enriched and ordered list of access points to the terminal 10.

The criterion relating to the service may be for example a profile of a user of the terminal in respect of the service. This profile of the user is obtained by the discovery server 24 during the authentication step E3 and is transmitted to the mediation entity 40 in the message N4. As a function of a policy of the network operator, the latter can favor access to the content by way of an access network chosen as a function of the profile of the user. By way of illustrative example, a network operator can propose two different access networks, a first UMTS and a second Wifi®. If the user has subscribed to a high service quality for the distribution of contents, it is then possible to favor his access to the contents by the UMTS access network. In the converse case, access to the contents is effected by way of the Wifi® network.

The criterion relating to the service may be a degree of loading of the contents distribution network, providing the service. The mediation entity 40 can thus notify the discovery server 24 of a loading problem on one of the contents distribution networks. Thus, the access points allowing access to this distribution network are placed preferably at the end of the ordered list so as to unload the contents distribution network.

The criterion relating to the service may be an occurrence of a problem on the contents distribution network as described above in conjunction with FIG. 5.

In the embodiment described above, the discovery server 24 constructs the list of access points and obtains the information relating to access to the service of the mediation entity. Provision may also be made for the discovery server 24 to transmit the list of access points to the mediation entity 40 and for the latter to enrich the list of access points with the aid of the information relating to access to the service and then retransmit the enriched list to the discovery server 24.

Figures 5, 6:
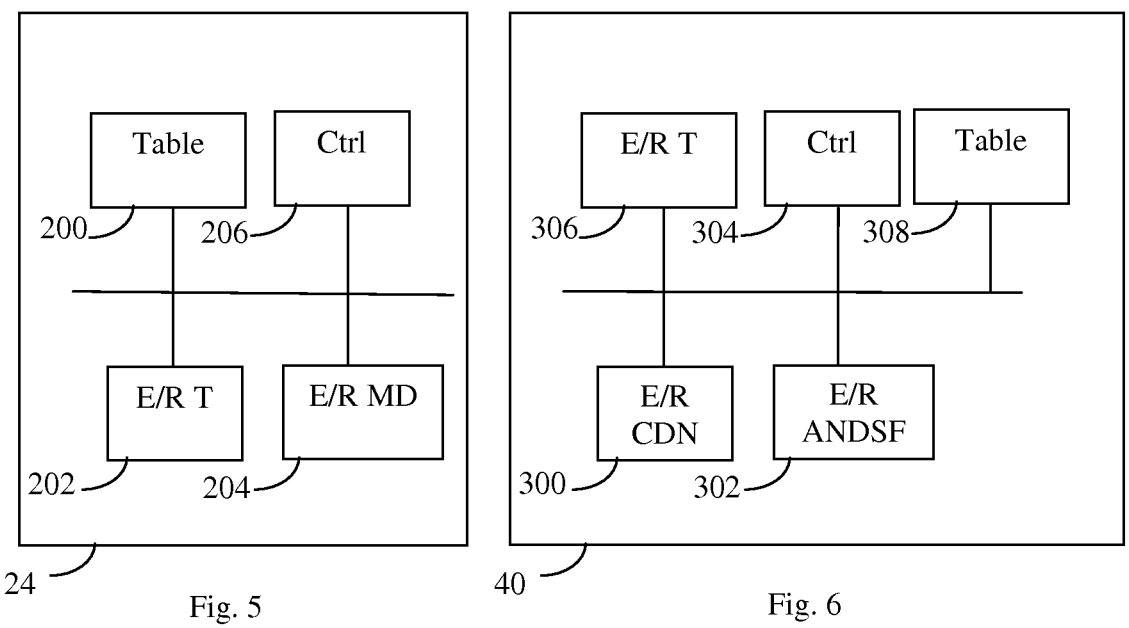
FIG. 5 represents a discovery device according to a particular embodiment of the invention.
FIG. 6 represents a mediation entity according to a particular embodiment of the invention.

A radio environment discovery device 24 will now be described in conjunction with FIG. 5. It is arranged to transmit to a terminal information relating to a radio environment.

Such a device comprises:
the storage means 200 described above, arranged to store for a location zone, a list of access points and for each access point an item of information relating to access to a service;
a module 202 for communication with the terminal, arranged to receive an access networks discovery request originating from the terminal and to transmit a list of access points to the latter in response to the request;
a module 206 for determining a list comprising at least one access point, said access point being designed to provide radio coverage of a current location of the terminal;
a module 204 for communication with a mediation entity 40.

The communication module 204 is in particular arranged to obtain from the mediation entity an item of information relating to access to a service by way of an access point.

The module 206 is also arranged to enrich a determined list of access points with the aid of the item of information obtained by the communication module 204 for an access point of the list. The module 202 is then arranged to transmit the enriched list to the terminal.

In a particular embodiment, the module 206 is furthermore arranged to order the enriched list as a function of at least one criterion relating to the service. The module 202 then dispatches the ordered list to the terminal.

A mediation entity 40 will now be described in conjunction with FIG. 6. The mediation entity 40 comprises:
a module 300 for communication with entities implementing a service;
a module 302 for communication with a discovery device 24;
a module 306 for communication with terminals;
a control module 304.

The module 300 is in particular arranged to obtain information relating to the service on the basis of the entities implementing the service. For the contents distribution service, the entities implementing the service belong to the contents distribution networks. The module 300 can in particular receive contextual information relating to a contents distribution network, for example notifications relating to problems encountered when distributing contents.

On the basis of the information obtained by the module 300, the control module 304 determines an item of information relating to access to the service for an access network, and thus for an access point of the access network.

The communication module 302 is in particular arranged to:
receive a request M1 issued by the discovery device 24 so as to obtain the information relating to access to the service and to issue a response M2 comprising a list of access networks making it possible to access the service;
receive a request N4 issued by the discovery device so as to obtain an item of information relating to access to the service by way of a given access point and to issue a response N5 comprising the requested item of information;
issue a notification message P2 informing of a problem on an access network.

The communication module 306 is in particular arranged to receive a request O7 for access to a content originating from a terminal and to issue a message O8 of redirection toward a contents distribution network selected by the module 304.

The mediation entity 40 comprises the storage means 308, described above, arranged to store for an association between an access network and one or more contents distribution networks.

In the variant described above, the mediation entity 40 furthermore comprises a table storing for a content and for each contents distribution network, an identifier of the content. In this variant, the module 304 is then arranged to select a contents distribution network as a function of the content sought by the terminal.

The modules 204, 206 of the network discovery device are arranged to implement those of the steps of the method of obtaining by a terminal of information relating to a radio environment described above which are executed by the discovery device. This preferably entails software modules comprising software instructions to execute those of the steps of the obtaining method described above which are implemented by a discovery device. The invention therefore also relates to:

a program for discovery device, comprising program instructions intended to control the execution of those of the steps of the obtaining method described above which are executed by said device, when said program is executed by a processor of the latter;

a recording medium readable by a discovery device on which the program for discovery device is recorded.

The module 304 of the mediation entity is arranged to implement those of the steps of the method of obtaining by a terminal of information relating to a radio environment described above which are executed by the mediation entity. This preferably entails software modules comprising software instructions to execute those of the steps of the obtaining method described above which are implemented by a mediation entity.

The software modules can be stored in or transmitted by a data medium. The latter can be a hardware storage medium, for example a CD-ROM, a magnetic diskette or a hard disk, or else a transmission medium such as an electrical, optical or radio signal, or a telecommunication network.

The invention also relates to a system 2 for obtaining information relating to a radio environment comprising a discovery device and a mediation entity such as are described above.

The discovery device 24 can also integrate the functions described above of the mediation entity 40 so as to form the system 2 for obtaining information relating to a radio environment.

Although the present disclosure has been described with reference to one or more examples, workers skilled in the art will recognize that changes may be made in form and detail without departing from the scope of the disclosure and/or the appended claims.

The invention claimed is:

1. A method of obtaining by a terminal of information relating to a radio environment, said method comprising the following acts:

reception by a discovery device of a discovery request in respect of a radio environment originating from the terminal;

determination by the discovery device of a list comprising a plurality of access points, belonging respectively to an access network and being designed to provide radio coverage of a current location of the terminal;

obtaining an item of information relating to access to a given service by way of the access points of the list;

enriching the list with the item of information obtained in association with the access point;

ordering the enriched list as a function of at least one criterion relating to the given service; and dispatching by the discovery device of the ordered list to the terminal.

2. The method as claimed in claim 1, furthermore comprising determining a list of access networks making it possible to access the given service, said determining act being implemented prior to the reception step.

3. The method as claimed in claim 1, in which the request transmitted by the terminal comprises an item of information relating to the given service.

4. The method as claimed in claim 1, in which the given service being a contents distribution service, the criterion belongs to the group consisting of a profile of a user of the terminal in respect of the given service, a degree of loading of a contents distribution network accessible by way of an access network, an occurrence of a problem on the contents distribution network.

5. The method as claimed in claim 1, in which the given service being a contents distribution service, a plurality of contents distribution networks being accessible by way of the access point, said method furthermore comprises:

receiving from the terminal an identifier of a content; and selecting a distribution network of said plurality as a function of the content identifier and of redirecting the terminal toward the selected distribution network.

6. The method as claimed in claim 5, comprising prior to the selecting act, a verification via an authenticating entity of the access network that the terminal is authenticated.

7. The method as claimed in claim 1, in which the given service being a contents distribution service, said method furthermore comprises:

receiving a contextual item of information relating to a contents distribution network;

updating the ordered list as a function of the contextual item of information; and dispatching the updated ordered list to the terminal.

8. A device for discovery of a radio environment, arranged to transmit to a terminal information relating to a radio environment, said device comprising:

means for receiving a discovery request in respect of a radio environment originating from the terminal;

means for determining a list comprising a plurality of access points, belonging respectively to an access network and designed to provide radio coverage of a current location of the terminal;

means for obtaining an item of information relating to access to a given service by way of the access points of the list;

means for enriching the list with the item of information obtained in association with the access point;

means for ordering the enriched list as a function of at least one criterion relating to the given service; and means for dispatching the ordered list to the terminal.

9. A system comprising:

a discovery device arranged to transmit to a terminal information relating to a radio environment, said device comprising:

means for receiving a discovery request in respect of a radio environment originating from the terminal;

means for determining a list comprising a plurality of access points, belonging respectively to an access network and designed to provide radio coverage of a current location of the terminal;

means for obtaining an item of information relating to access to a given service by way of the access points of the list;

means for enriching the list with the item of information obtained in association with the access point;

means for ordering the enriched list as a function of at least one criterion relating to the given service; and means for dispatching the ordered list to the terminal; and a mediation entity, said entity comprising:

means for obtaining information relating to the given service on the basis of entities implementing the given service; and communication means, arranged to provide the discovery device with the item of information relating to access to the given service by way of an access point.

10. A hardware storage medium comprising a computer program stored thereon and comprising instructions for implementation of a method of obtaining by a terminal information relating to a radio environment, implemented by a network discovery device, when this program is executed by a processor, said method comprising the following acts:

reception by the discovery device of a discovery request in respect of a radio environment originating from the terminal;

determination by the discovery device of a list comprising a plurality of access points, belonging respectively to an access network and being designed to provide radio coverage of a current location of the terminal;

obtaining an item of information relating to access to a given service by way of the access points of the list;

enriching the list with the item of information obtained in association with the access point;

ordering the enriched list as a function of at least one criterion relating to the given service; and dispatching by the discovery device of the ordered list to the terminal.

11. A terminal, arranged to obtain information relating to a radio environment, said terminal comprising:

means for dispatching destined for a discovery device a discovery request in respect of said radio environment;

means for receiving from said discovery device, a list comprising a plurality of access points associated with an item of information relating to access to a given service by way of said access points, said list being ordered as a function of a criterion relating to said given service, said access points furthermore belonging respectively to an access network and designed to provide radio coverage of a current location of said terminal; and means for selecting from said list an access point allowing access to said given service sought by said terminal.

* * * * *